(12) United States Patent
Forbord et al.

(10) Patent No.: US 9,460,756 B1
(45) Date of Patent: Oct. 4, 2016

(54) HERMETICALLY SEALED APPARATUS WITH SEAL GUARD

(71) Applicant: Seagate Technology LLC, Cupertino, CA (US)

(72) Inventors: Kent J. Forbord, Minneapolis, MN (US); Andrew J. Hutchinson, New Prague, MN (US); Steven L. Weber, Ramsey, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/860,937

(22) Filed: Sep. 22, 2015

(51) Int. Cl.
*G11B 33/14* (2006.01)
*G11B 33/08* (2006.01)

(52) U.S. Cl.
CPC .............. *G11B 33/08* (2013.01); *G11B 33/14* (2013.01)

(58) Field of Classification Search
CPC .............................. G11B 33/14; G11B 5/012
USPC ........... 360/99.2, 99.12, 99.21, 99.11, 99.22, 360/97.16, 97.01, 97.02
See application file for complete search history.

(56) References Cited

U.S. PATENT DOCUMENTS

| | | | |
|---|---|---|---|
| 6,496,362 B2 | 12/2002 | Osterhout et al. | |
| 2011/0310509 A1* | 12/2011 | Stipe | G11B 25/043 360/967.22 |
| 2012/0275286 A1 | 11/2012 | McGuire, Jr. | |
| 2015/0332733 A1* | 11/2015 | Lapp et al. | H02K 5/12 360/99.08 |

* cited by examiner

*Primary Examiner* — Allen T Cao
(74) *Attorney, Agent, or Firm* — Crawford Maunu PLLC

(57) ABSTRACT

Certain exemplary aspects of the present disclosure are directed towards an apparatus in which a base deck and a cover are coupled to one another via a coupling that forms a hermetic seal around a cavity defined by the base deck and the cover. A guard protects the coupling from external forces via a surface aligned with and extending along the coupling.

20 Claims, 3 Drawing Sheets

FIG. 1A     FIG. 1B

HERMETICALLY SEALED APPARATUS WITH SEAL GUARD

SUMMARY

Various example embodiments are directed to hermetically sealed apparatuses with a base deck and cover that are joined to form a cavity, with a guard that protects the joint between the base deck and cover from external forces, such as may result from contacting the disc drive with other objects, or dropping the disc drive. In various implementations, the guard is coupled to one or both of the cover and the base deck, and includes a surface aligned with and extending along the joint. The guard absorbs and/or deflects the external forces away from the joint, which can mitigate or prevent the escape of atmosphere from within the disc drive cavity associated with a damaged joint.

A variety of joints may be used to join the base deck and cover, with the guard being configured/operable to protect the joint. In various implementations, the cover and base deck are joined using a coupling such as a weld, adhesive, mechanical labyrinth, or fastener, which may provide a relatively low permeability path for the flow of atmosphere out of and into the cavity. Certain embodiments achieve low coupling permeability by utilizing advanced welding techniques (e.g., tungsten inert gas welding, gas tungsten arc welding, laser welding, plasma welding, friction stir welding, and others), and/or utilizing materials and joints with desirable characteristics. Various implementations of the present disclosure may address porosity and other weld-related defects that affect the ability of a weld to hermetically seal a cavity. The guard operates with the base deck and cover to protect and preserve the hermetic seal, which may otherwise be vulnerable to external forces as may, for example, take place during assembly of the disc drive, shipping, or customer handling. One or more such embodiments may be particularly applicable to disc drives in which a weld couples the base deck and the cover, in which dimensions of the disc drive may necessitate a shallow weld that may be highly susceptible to deformation and cracking from external forces (e.g., relative to a deep weld). Accordingly, various embodiments address challenges to the manufacturing, shipping, use, and overall longevity of hermetically sealed disc drives.

Various embodiments of the present disclosure are directed to hermetically sealed apparatuses having a guard that protects the hermetic seal from external forces. In various implementations, such an apparatus includes a base deck with a cavity. The base deck further includes a lip, extending along an upper surface of the base deck, which defines an opening into the cavity of the base deck. The guard extends from the upper surface of the base deck and laterally around the lip. A cover with a periphery aligned with and extending along an inner surface of the guard joins to the lip of the base deck by a weld. The weld blends a portion of material from the base deck with a portion of material from the cover, thereby hermetically sealing the cavity within.

The guard protects the weld from external forces by, for example, either deflecting or absorbing such forces away from the weld and the cover. Such external forces may, for example, result from impact or other contact that may otherwise damage the weld during assembly, shipping, or customer handling, and cause the hermetic seal of the weld to fail or degrade at a faster rate (e.g., due to the formation of discontinuities that exacerbate the permeation of low-density atmosphere through the weld). Accordingly, the guard mitigates leakage or increases in leak rate of an atmosphere within the disc drive, which may preserve function of the disc drive over an intended life-span of the disc drive (e.g., five or more years).

Other aspects of the present disclosure are directed to an apparatus that includes a base deck and cover that are sealed to form a cavity, and a guard that fully encompasses the cover and protects the seal from external forces. The cover has a periphery extending along a lip of the base deck, and a weld joins the lip of the base deck to the periphery of the cover, hermetically sealing the cavity with a portion of material from the lip blended with a portion of material from the periphery of the cover. The guard includes a surface aligned with and extending along the weld.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIG. 1A is an isometric view of a partially assembled disc drive, consistent with various aspects of the present disclosure;

FIG. 1B is an isometric view of the partially assembled disc drive of FIG. 1A, consistent with various aspects of the present disclosure;

Figure 1C:
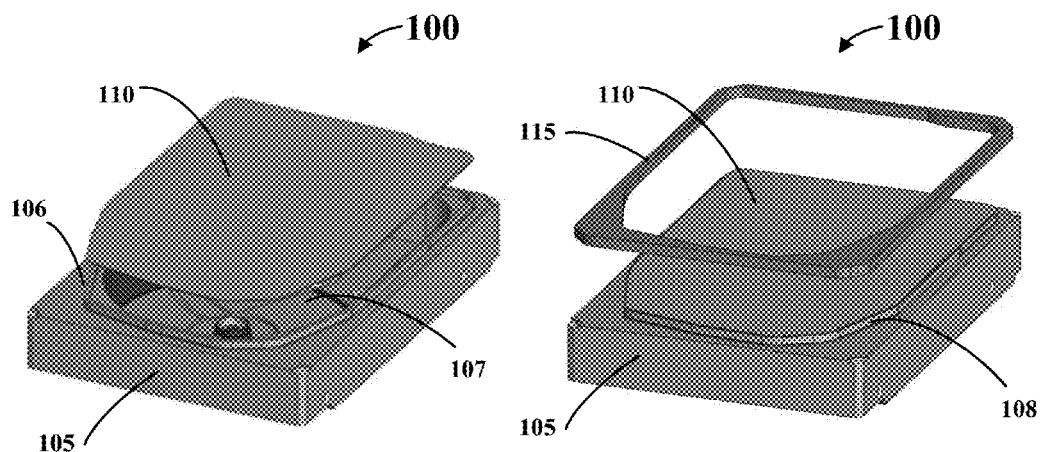
FIG. 1C is an isometric view of the assembled disc drive of FIGS. 1A-B, consistent with various aspects of the present disclosure.
Figure 1C:
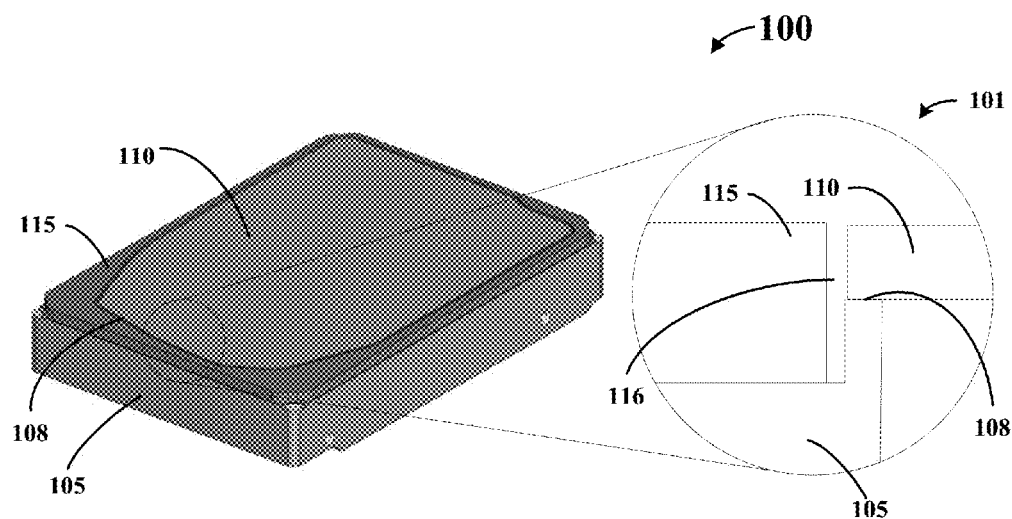

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of devices, systems and arrangements involving hermetically sealed cavities having components that are joined (e.g., welded or otherwise coupled). A guard is employed to protect the components at the junction/seal, such as by shielding a weld or other joint from impact. Specific embodiments are believed to be particularly beneficial for implementations involving sealed disc drives, such as those containing low-density atmosphere (e.g., helium). In such embodiments, the guard helps to maintain the low-density atmosphere by protecting the junction/seal, which can be particularly beneficial to welds of thin materials that may be particularly prone to damage, leaking or other conditions that may result from external forces being applied to the disc drive. While the present invention is not necessarily so limited, various aspects of the invention may be appreciated through a discussion of examples using this context.

In various embodiments, the guard is coupled to at least one of a cover and base deck of a disc drive, which are joined to seal a cavity within the disc drive. The guard has a surface aligned with and extending along a joint between the cover and a base deck, and protects the joint from external forces (e.g., by absorbing the external forces and/or deflecting the external forces away from the coupling). The guard thus operates in conjunction with the weld to mitigate or prevent the escape of low-density atmosphere from within the disc drive cavity, as may result from the application of such external forces.

Various example embodiments are directed to such hermetically sealed apparatuses having a base deck and a cover that define a cavity, which are joined via one or more of a weld, adhesive, mechanical labyrinth, or other fastener. The coupling provides a relatively low permeability path for the flow of atmosphere out of and into the cavity, facilitating the hermitic seal. Certain embodiments achieve low coupling permeability by implementing advanced welding techniques (e.g., tungsten inert gas welding, gas tungsten arc welding, laser welding, plasma welding, friction stir welding, and others), and/or utilizing materials and joints with improved welding characteristics. These techniques may be implemented to prevent the occurrence of porosity and other weld-related defects that may affect the ability of a weld to hermetically seal the cavity.

Various such embodiments are readily applicable to sealed disc drive applications, in which maintaining low-density atmosphere within the disc drive cavity is useful or necessary for stable performance of the disc drive over an intended life span. Components of such a disc drive may be designed to operate in the low-density atmosphere, and deviations from the original atmosphere at the time of manufacturing may cause performance degradation of the disc drive altogether. For example, in some implementations a slider, designed for a low-density atmosphere disc drive environment, positions a transducer for accessing data on a rotating storage medium at a precise height above the storage medium. If the atmosphere in the cavity were to degrade to include higher-density molecules (as found in air), the sliders would begin to exhibit dissimilar aerodynamic characteristics such as increased lift. This increased lift may result in a fly-height that exceeds the transducers range for accessing the storage medium resulting in an effective failure of the disc drive. Accordingly, the weld and guard operate to protect the sealed disc drive, to mitigate issues that may otherwise occur due to impact or other forces upon the disc drive.

Various embodiments involve a guard that addresses challenges present with hermetically sealed implementations in which a coupling between a base deck and cover of a disc drive is vulnerable to damage from external forces such as those resulting from contact to a disc drive during assembly, shipping, and customer handling (e.g., dropping the disc drive, contacting the coupling with an assembly fixture or server rack). The coupling may be more susceptible then the rest of the drive as the dimensional limitations of the disc drive may, for example, require a shallow weld. In many embodiments, the coupling is the most susceptible portion of the disc drive. For instance, the impact of external force upon the disc drive may cause a shock sufficient to cause cracking at a weak point of the weld (which may not be at the impact point). In yet other cases, external forces may not breach the hermetic seal of the coupling altogether, but render the coupling insufficient to maintain a low-density atmosphere within the disc drive for the lifespan of the disc drive. Minor impacts at the weld (or other joint) may be sufficient to open up pores (discontinuities) that may accelerate a leak rate from the disc drive beyond an acceptable leak threshold, which can render the disc drive incapable of maintaining a low-density atmosphere). The use of a guard and corresponding base deck/cover seal can address these and other challenges to the manufacturing, shipping, use, and overall longevity of hermetically sealed disc drives, including those discussed above.

Various example embodiments are directed to apparatuses with components that are coupled to form hermetically sealed cavities, via a weld, with relatively low permeability. Such embodiments generally include conditions in which material, size/spacing of the weld, and welding techniques may undesirably impact the resulting weld and its permeability. Certain embodiments achieve low weld permeability by implementing advanced welding techniques, enhanced weld depths, and materials and joints with improved welding characteristics to address porosity and other weld-related defects that may affect the ability of a weld to hermetically seal the cavity. However, to achieve the desired low-permeability, the weld may sacrifice other desirable material characteristics such as resilience to impacts (shocks), making the weld brittle and prone to discontinuities and cracks in response to external forces. Implementations of the present disclosure protect the weld from external forces by coupling a guard to one or both of the cover and the base deck of a disc drive, with a surface of the guard aligned with and extending along a weld that hermetically seals the cover to the base deck such that the guard protects the weld from external forces.

One or more embodiments may be particularly applicable, for example, to disc drives in which a laser weld is formed between a base deck and a cover, in which the weld mitigates or (mostly) prevents the escape of low density atmosphere from within a disc drive cavity. In conjunction with one or more such embodiments, it has been discovered that an approach involving laser welding implementations can achieve a bond with limited surface cracks, and internal discontinuities, that may otherwise increase a leakage rate of low density atmosphere out of (and external atmosphere into) the disc drive. The use of a guard to protect the resulting weld facilitates the use of laser welding and the resulting weld, which may exhibit generally high susceptibility to damage. For instance, in certain embodiments a weld may exhibit undesirable physical characteristics, such as brittleness, shallow dimensions relating to joint configuration, shallow welds relating to laser power limitations, and/or material selection that prevents realloying of the weld. These characteristics may render the weld susceptible to failure under forces that contact or exhibit shear stress on the weld, which may result in cracking and other discontinuities. To address such problems, disc drives consistent with the present disclosure utilize the guard to absorb and/or deflect external forces away from the weld, and/or using a guard to limit the application of shear stresses on the weld (e.g., by aligning a top surface of the guard with a top surface of the cover).

In many embodiments, a cavity between a disc drive base deck and cover are hermetically sealed with a low-density atmosphere in a cavity therein, to maintain a rate of low density atmosphere leakage from the cavity that is not greater than 1% of the low-density atmosphere volume in the cavity per year (a leak rate of less than $1\times10^{-8}$ cm$^3$/sec). These embodiments may be employed, for example, for a 3.5" form factor disc drive with a cavity volume of 100 cm$^3$. Such a leakage rate is sufficient to maintain 95% of the low-density atmosphere volume within the cavity over an exemplary life of the disc drive, five years. In various embodiments of the present disclosure, it has been discovered that impacts to hermetically sealed disc drives can cause damage to the coupling which may increase a leakage rate of the atmosphere within the disc drive to a level that is not sustainable, and would result in the disc drive low-density atmospheric volume being reduced to less than 95% over the life of the disc drive (e.g., 5 years). Such a change in the atmospheric density in the cavity may cause performance degradation including increased power usage and operating temperature. In certain cases of atmospheric leakage from the cavity, a slider that flies a transducer over a rotating storage medium to access data thereon may suffer from flight characteristics that prevent the transducer from accessing data on the medium. Specifically, in response to a higher-density atmosphere introduced into the cavity (e.g., air), the slider's fly-height at an operational rotational speed of the medium will increase as the high-density atmosphere provides additional lift under the slider. Accordingly, the slider height may exceed an optimal fly-height for reading and writing data to the medium and effectively cause the disc drive to fail.

Various embodiments of the present disclosure are directed to hermetically sealed apparatuses with a guard that protects the seal from external force, in which the apparatus includes a base deck with a cavity. A cover encloses the cavity formed by the base deck and includes a periphery extending along a lip of the base deck. A weld joins the lip of the base deck to the periphery of the cover by blending a portion of material from the lip with a portion of material from the periphery of the cover. The weld, in conjunction with the cover and the base deck, hermetically seals an atmosphere within the cavity. Maintaining a low-density atmosphere of the disc drive cavity, for example, provides a number of characteristics that may be desirable, including reduced power to rotate the storage medium therein (due to decreased wind resistance), and decreased operating temperatures. A guard, including a surface aligned with and extending along the weld, is coupled to the cover and/or the base deck. The guard protects the weld from external forces in manners such as those characterized herein.

In certain embodiments, the base deck includes a recess at an upper surface of the base deck, in which the recess includes an exterior periphery defined by the surface of the guard, with the weld being joined to the lip of the base deck within the recess. In more specific embodiments, the cover is joined to the base deck in the recess, which is defined by an inner periphery of the guard (e.g., with the guard integrated with the base deck).

In one embodiment, an apparatus includes a base deck with a cavity. The base deck includes a lip extending along an upper surface of the base deck, which defines an opening into the cavity. The base deck also includes a guard that extends from the upper surface of the base deck and laterally around the lip. A cover having a periphery aligned with and extending along an inner surface of the guard, is joined to the lip of the base deck by a weld that blends material from both the base deck and the cover, thereby hermetically sealing the cavity.

In various embodiments, a guard as characterized herein encapsulates the cover and the joint (e.g., weld) between the cover and base deck. In such embodiments, the guard may be coupled to at least one of the cover and the base deck by a weld along a periphery of the guard. In some implementations, the guard operates in conjunction with the cover, the base deck, the weld, and the additional weld to hermetically seal a second cavity between the cover and the guard. Such an additional hermetic seal further limits the escape of an atmosphere from within the cavity of the disc drive by providing a redundant seal, which may exponentially reduce the leak rate of atmosphere from within the disc drive.

Other aspects of the present disclosure teach an apparatus that includes a base deck with a cavity. A cover encloses the cavity of the base deck and includes a periphery extending along a lip of the base deck. A weld joins the lip of the base deck to the periphery of the cover, therein hermetically sealing the cavity. The weld includes a portion of material from the lip blended with a portion of material from the periphery of the cover. A guard, including a surface aligned with and extending along the weld, is coupled to the cover and/or the base deck. The guard fully encompasses the cover and protects the weld and cover from external forces that may damage the weld and/or cover, thereby compromising the hermetic seal.

In several embodiments of an apparatus in accordance with the present disclosure, a base deck includes a guard that protects a joint between the base deck and a cover that seals a cavity within the base deck. The weld encloses disc drive components within the cavity, with the guard including a surface that is aligned with and extends along the weld. In some embodiments, the guard includes a protrusion that extends upward from an upper surface of the base deck. In certain embodiments, the protrusion extends along a sidewall of the base deck, and in other embodiments the protrusion has a periphery that is partially or wholly offset within sidewalls of the base deck. The guard protects the weld from external forces in manners such as those characterized herein.

Aspects of the present disclosure are directed to an apparatus having a guard separated from a weld by a gap region, with the guard and gap region protecting the weld from external forces. More specifically, the guard operates to deform into the gap region in response to external forces, thereby absorbing the external forces and mitigating the transfer of the external forces to the weld. In certain embodiments, the guard includes crush features that deform to absorb external forces. In other embodiments, the surface of the guard are in direct contact with a weld, which protects the weld from external forces by preventing external forces from being directly exerted upon the weld (e.g., by absorbing some or all forces in the guard, or otherwise mitigating translation of the forces to the weld).

Turning now to the figures, various embodiments of the present disclosure are presented by way of the illustrations. FIG. 1A shows an isometric view of a disc drive, consistent with various aspects of the present disclosure. For figure clarity, various exemplary internal disc drive components as may be implemented within base deck 105 are not shown. The base deck 105 includes a lip 106 extending along a periphery of the base deck. When assembled, the lip 106 and an outer periphery of cover 110 form a joint, using one or more of a variety of approaches. The cover 110 and the base deck 105 enclose a cavity 107, which houses components of the disc drive.

FIG. 1B is an isometric view of the disc drive 100, consistent with various aspects of the present disclosure. A weld 108 joins lip 106 of the base deck 105 and a periphery of the cover 110, and a guard 115 is coupled to a top surface of the base deck 105 along an outer periphery of the weld. The guard 115 is arranged with the weld 108 and cover 110 to protect the weld 108 from external forces, such as may result from contacting the apparatus 100 with other objects, impacting the apparatus with other objects, dropping the apparatus or otherwise involving shear stresses.

FIG. 1C is an isometric view of the disc drive 100 as assembled, consistent with various aspects of the present disclosure. A top surface of the guard 115 is parallel with a top surface of the cover 110 and protects a periphery of the cover and weld 108 joining the base deck 105 to the cover. In one embodiment, consistent with the above, the guard 115 deforms in response to external forces, therein absorbing the force and preventing some or all of the force from translating to the weld 108 and/or the cover 110. In other embodiments, the guard 115 includes materials with material characteristics that deflect such external forces away from the weld 108 and/or the cover 110. As shown in the cross-sectional, inset view 101 of FIG. 1C, it may be desirable to space the weld 108 apart from the guard 115, forming a gap 116 between the guard and cover 110. The gap 116 prevents external forces exerted on the guard 115 from being transferred to the weld 108. In other embodiments, the weld 108 is in contact with the guard 115 to prevent foreign objects (and forces) from directly contacting the weld 108.

Figure 2A:
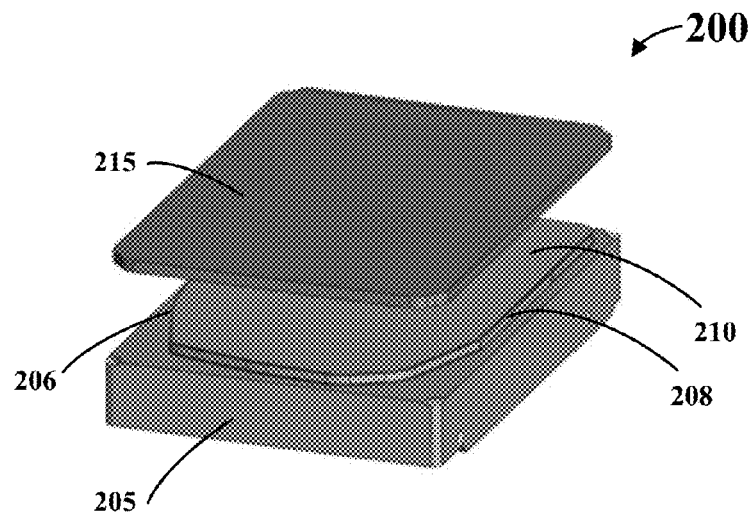
FIG. 2A is an isometric view of a partially assembled disc drive, consistent with various aspects of the present disclosure.
Figure 2B:
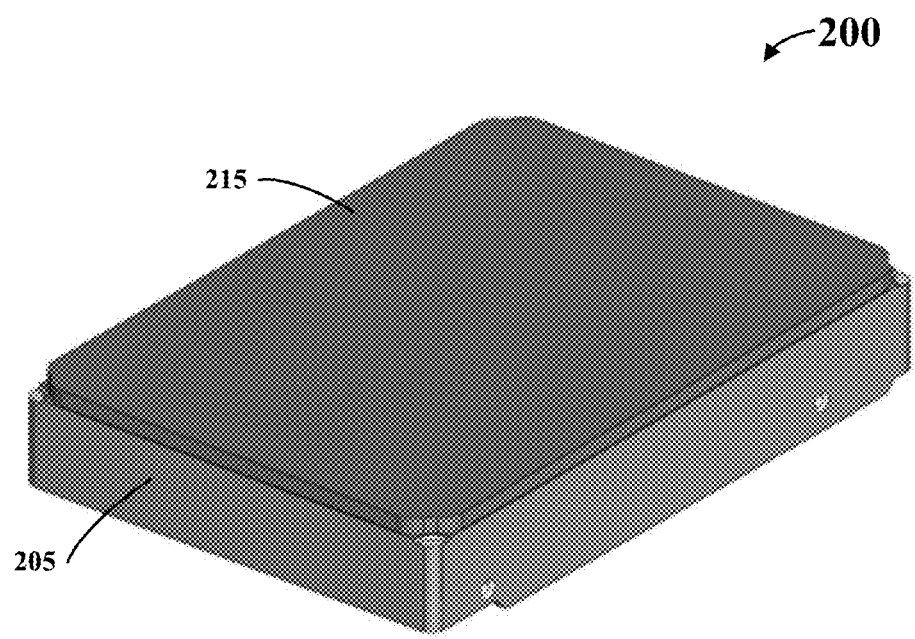
FIG. 2B is an isometric view of the assembled disc drive of FIG. 2A, consistent with various aspects of the present disclosure.

FIG. 2A is an isometric view of a disc drive 200, with FIG. 2B showing the disc drive as assembled, consistent with various aspects of the present disclosure. The apparatus 200 includes a base deck 205 having a lip 206 extending from a top surface of the base deck and along a periphery thereof. A cover 210 is coupled to the lip 206 at a joint 208 such as a weld joint. It is to be understood that the interface (joint) between the lip 206 and the cover 210 can be implemented with a variety of types of joints, consistent with the discussion of FIGS. 1A-1C.

A guard 215 is coupled to the base deck 205 and completely encompasses the cover 210 and weld 208. Guard 215 may be coupled to base deck 205 by a fastener or coupling mechanism that will secure the guard to the base deck, which may effectively transfer external forces exerted on the guard to the base deck while mitigating transfer of such external forces on to either a cover or a weld.

Figure 3A:
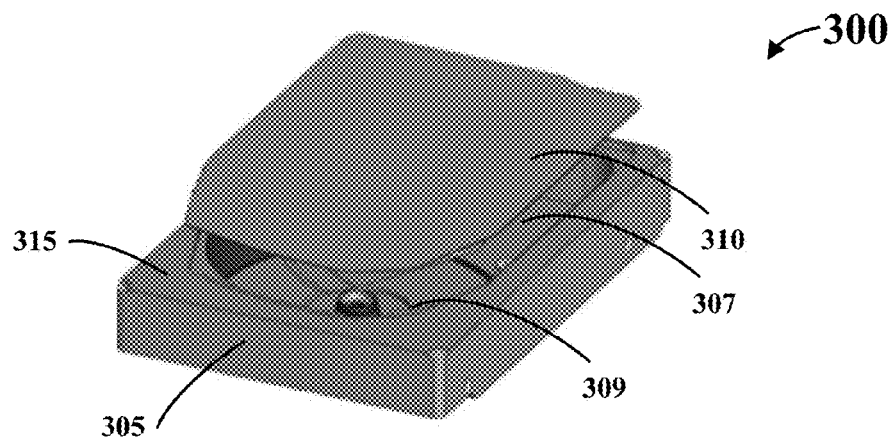
FIG. 3A is an isometric view of a partially assembled disc drive, consistent with various aspects of the present disclosure.
Figure 3B:
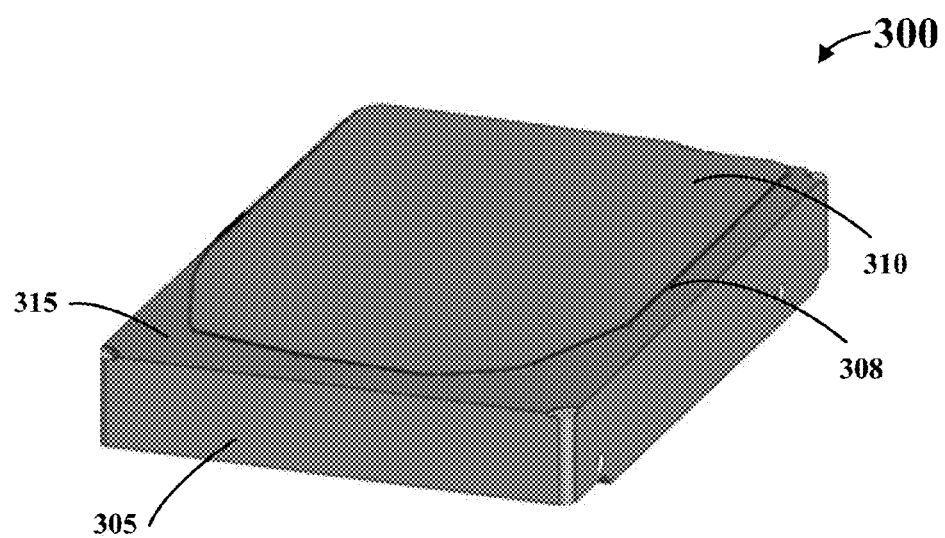
FIG. 3B is an isometric view of the assembled disc drive of FIG. 3A, consistent with various aspects of the present disclosure.

FIG. 3A is an isometric view of a disc drive 300, and FIG. 3B shows the apparatus as assembled, consistent with various aspects of the present disclosure. A base deck 305 is joined to a cover 310 by a weld 308, along a recessed lip 309 along an inner periphery of cavity 307. This allows for the recessed placement of the cover 310 within an inner periphery of guard 315, which is integrated within the cover 310 and protects the weld.

The weld 308 is implemented to hermetically seal disc drive components within the base deck 305, and may be located along a partial lap joint between the cover 310 and base deck 305, that allows for the use of various welding techniques (including techniques capable of penetrating into a substantial portion of the lap joint). In such an embodiment, the length of the lap joint allows for a weld that extends into the lap joint, decreasing permeability related concerns associated with welding techniques with limited penetration. A remaining portion of the lap joint may be used to form a mechanical labyrinth that further limits a path for the flow of atmosphere out of and into the cavity 307.

In various embodiments, the weld 308 may be formed using a welding tool with a vertical orientation. This vertical orientation is particularly well suited for existing disc drive assembly processes which utilize assembly tooling oriented above the disc drive. In such assembly processes, the disc drive 300 need not necessarily be manipulated during the welding process, and the welding tool can be manipulated along a horizontally-oriented plane above the cover 310 to form the weld 308.

Based upon the above discussion and illustrations, those skilled in the art will readily recognize that various modifications and changes may be made to the present disclosure without strictly following the exemplary embodiments and applications illustrated and described herein. For example, the shape and location of the joints and friction-stir welding methodologies need not conform to the exemplary embodiments discussed herein; hermetically sealed apparatuses as claimed may cover a wide variety of shapes and variations of such a welded/hermetically sealed structure, including irregular joints (e.g., mechanical labyrinths), non-parallel joints, and welded components with varying length/width/thickness. Such modifications do not depart from the true spirit and scope of the present disclosure, including that set forth in the following claims.

What is claimed is:

1. A disc drive apparatus comprising:
   a base deck including a cavity within the base deck;
   a cover that encloses the cavity and includes a periphery extending along a lip of the base deck;
   a weld that joins the lip of the base deck to the periphery of the cover, the weld including a portion of material from the lip blended with a portion of material from the periphery of the cover, the weld being configured and arranged with the cover and the base deck to hermetically seal the cavity; and
   a guard having a surface aligned with and extending along the weld and coupled to at least one of the cover and the base deck, the guard being configured and arranged to protect the weld from external forces.

2. The apparatus of claim 1, wherein the guard is further configured and arranged to, in response to the external forces being exerted on the apparatus proximal the weld, absorb the external forces or deflect the external forces away from the weld, thereby mitigating damage to the weld.

3. The apparatus of claim 1, wherein
   the weld has a periphery that extends along an interior region of a top surface of the base deck, and
   the guard extends laterally around the weld on an exterior region of the top surface of the base deck, therein shielding the weld from lateral forces applied to the apparatus.

4. The apparatus of claim 1, wherein the base deck includes the guard.

5. The apparatus of claim 4, wherein the guard includes a protrusion that extends upward from an upper surface of the base deck.

6. The apparatus of claim 4, wherein the base deck includes a recess at an upper surface of the base deck, the recess having an exterior periphery defined by the surface of the guard, wherein the weld is joined to the lip of the base deck within the recess.

7. The apparatus of claim 1, wherein the cover is joined to the base deck in a recess defined by an inner periphery of the guard.

8. The apparatus of claim 1, wherein the guard encapsulates the cover and the weld.

9. The apparatus of claim 8, wherein the guard is coupled to at least one of the cover and the base deck by an additional weld along a periphery of the guard, the guard being configured and arranged with the cover, the base deck, the weld, and the additional weld to hermetically seal a second cavity between the cover and the guard.

10. The apparatus of claim 1, wherein the guard is separated from the weld by a gap region between the guard and the weld, and is configured and arranged to deform into the gap region in response to the external forces, thereby absorbing the external forces and mitigating transfer of the external forces to the weld.

11. The apparatus of claim 1, wherein the guard includes crush features, the crush features configured and arranged to deform in response to external forces thereby absorbing the external forces and mitigating transfer of the external forces to the weld.

12. The apparatus of claim 1, wherein the surface of the guard is in direct contact with the weld, the guard being configured and arranged to protect the weld from external forces by preventing external forces from being directly exerted upon the weld.

13. The apparatus of claim 1, wherein a top surface of the guard and a top surface of the cover are flush.

14. An apparatus comprising:
a base deck including
a cavity within the base deck,
a lip extending along an upper surface of the base deck and defining an opening into the cavity, and
a guard extending from the upper surface of the base deck and laterally around the lip; and
a cover joined to the lip by a weld and having a periphery aligned with and extending along an inner surface of the guard, the weld including a portion of material from the base deck blended with a portion of material from the cover, the weld being configured and arranged with the cover and the base deck to hermetically seal the cavity.

15. The apparatus of claim 14, wherein the guard is further configured and arranged to, in response to external forces being exerted on the apparatus proximal the weld, absorb the external forces or deflect the external forces away from the weld, thereby mitigating damage to the weld.

16. The apparatus of claim 14, wherein
the weld has a periphery that extends along an interior region of a top surface of the base deck, and
the guard extends laterally around the weld on an exterior region of the top surface of the base deck, therein shielding the weld from lateral forces applied to the apparatus.

17. The apparatus of claim 14, wherein the base deck includes the guard, and the guard includes a protrusion that extends upward from an upper surface of the base deck.

18. The apparatus of claim 14, wherein the base deck includes the guard and a recess at an upper surface of the base deck, the recess having an exterior periphery defined by the surface of the guard, wherein the weld is joined to the lip of the base deck within the recess.

19. An apparatus comprising:
a base deck including a cavity within the base deck;
a cover that includes a periphery extending along a lip of the base deck, the cover enclosing the cavity of the base deck;
a weld that joins the lip of the base deck to the periphery of the cover, the weld including a portion of material from the lip blended with a portion of material from the periphery of the cover, the weld being configured and arranged with the cover and the base deck to hermetically seal the cavity; and
a guard having a surface aligned with and extending along the weld and coupled to at least one of the cover and the base deck, the guard being configured and arranged to fully encompass the cover and protect the weld and cover from external forces.

20. The apparatus of claim 19, wherein the guard is coupled to at least one of the cover and the base deck by an additional weld along a periphery of the guard, the guard being configured and arranged with the cover, the base deck, the weld, and the additional weld to hermetically seal a second cavity between the cover and the guard.

* * * * *